United States Patent [19]

Wheaton et al.

[11] 4,452,398
[45] Jun. 5, 1984

[54] PORTABLE IRRIGATION BRAKE

[76] Inventors: L. A. Wheaton; Janette Wheaton, both of Green Acres, Phillipsburg, Kans. 67661

[21] Appl. No.: 414,732

[22] Filed: Sep. 3, 1982

[51] Int. Cl.³ .............................................. A01G 21/02
[52] U.S. Cl. .................................................... 239/712
[58] Field of Search ................ 239/276, 587, 712–717, 239/709–711

[56] References Cited

U.S. PATENT DOCUMENTS

| | | | |
|---|---|---|---|
| 614,507 | 11/1898 | Skinner | 239/276 |
| 3,087,680 | 4/1963 | Purtell | 239/709 |
| 3,091,401 | 5/1963 | Hruby, Jr. | 239/276 |
| 3,166,088 | 1/1965 | Kern | 137/344 |
| 3,230,969 | 1/1966 | Purtell | 239/717 |
| 3,526,364 | 9/1970 | Hattis | 239/212 |
| 3,613,703 | 10/1971 | Stout | 137/1 |
| 3,618,859 | 11/1971 | Watts | 239/276 |
| 3,726,366 | 4/1973 | Williams | 188/6 |
| 3,878,860 | 4/1975 | Pritchard | 239/713 |
| 4,164,323 | 8/1979 | Ellison | 239/276 |
| 4,191,206 | 4/1980 | Baker | 137/344 |

Primary Examiner—John J. Love
Assistant Examiner—Jon M. Rastello
Attorney, Agent, or Firm—Henderson & Sturm

[57] ABSTRACT

This invention relates to braking mechanism for mobile irrigation systems in general, and more specifically to vertically adjustable, elongated, wheeled, brake member that is clamped around and carried by the irrigation pipe itself.

10 Claims, 3 Drawing Figures

PORTABLE IRRIGATION BRAKE

While the prior art is replete with ground penetrating brake mechanisms for mobile irrigation sustems, as can be seen by reference to U.S. Pat. No. 4,164,323; 4,191,206; 3,526,364; 3,166,088; 3,726,366 and 3,613,703; these patented structures have not met with widespread commercial success for a number of reasons.

Some of the more glaring deficiencies found in the prior art structures are as follows; single point or small surface area penetration of the ground by the brake member; the use of a multiplicity of separate ground pentrating means to achieve bi-directional braking; the complexity of the braking mechanism, which requires several steps to engage and disengage the brake element; the necessity to modify the existing irrigation structure to accommodate the braking mechanism; the difficulties created by the mere presence of the braking mechanism on the irrigation system, when the system is in its mobile mode, including rotary imbalance imparted to the wheel carried braking mechanisms, standing crop damage as the wheeled irrigation system is transported through the fields; and the inability of the brake members to be rotated relative to the irrigation pipe, to facilitate transport of the device, to name but a few.

This partial list of shortcomings of the prior art devices enumerated supra, made it all too evident that despite previous efforts, there was a pressing need for improvements in the design and construction of this type of device. As a result, the construction which forms the basis of the present invention was developed, and as will be seen, the finished product represents a major advancement in this area of technology.

SUMMARY OF THE INVENTION

An object of the present invention is the provision of an improved brake mechanism for mobile irrigation systems, which is easy to install and use.

A further object of the present invention is the provision of a vertically adjustable, bi-directional brake mechanism for mobile irrigation systems.

Another object of the present invention is the provision of a single elongated brake element, that employs a plurality of ground penetrating means spaced along its length.

Still another object of the present invention, is the provision of a braking mechanism for an irrigation system, that is carried on, and rotatable with respect to, the irrigation pipe.

Yet another object of the present invention is the provision of a counterbalanced, wheeled brake mechanism for a mobile irrigation system.

A yet another object of the present invention is the provision of a braking mechanism for mobile irrigation systems, that will minimize the damage to standing crops as the irrigation system moves through the fields.

A still further object of the present invention is the provision of a brake mechanism for mobile irrigation systems, that comprises a very small number of components, and is adapted for connection, at any point, along the length of the irrigation pipe.

Yet another object of the present invention is the provision of a brake mechanism for mobile irrigation systems, that overcome all of the deficiences found in the prior art devices.

These and other objects, advantages, and nobel features of the invention will become apparent from a detailed reading of the description that follows, when considered in conjunction with the accompanying drawings.

DETAILED DESCRIPTION OF THE PREFERRED EMBODIMENT

Figure 1:
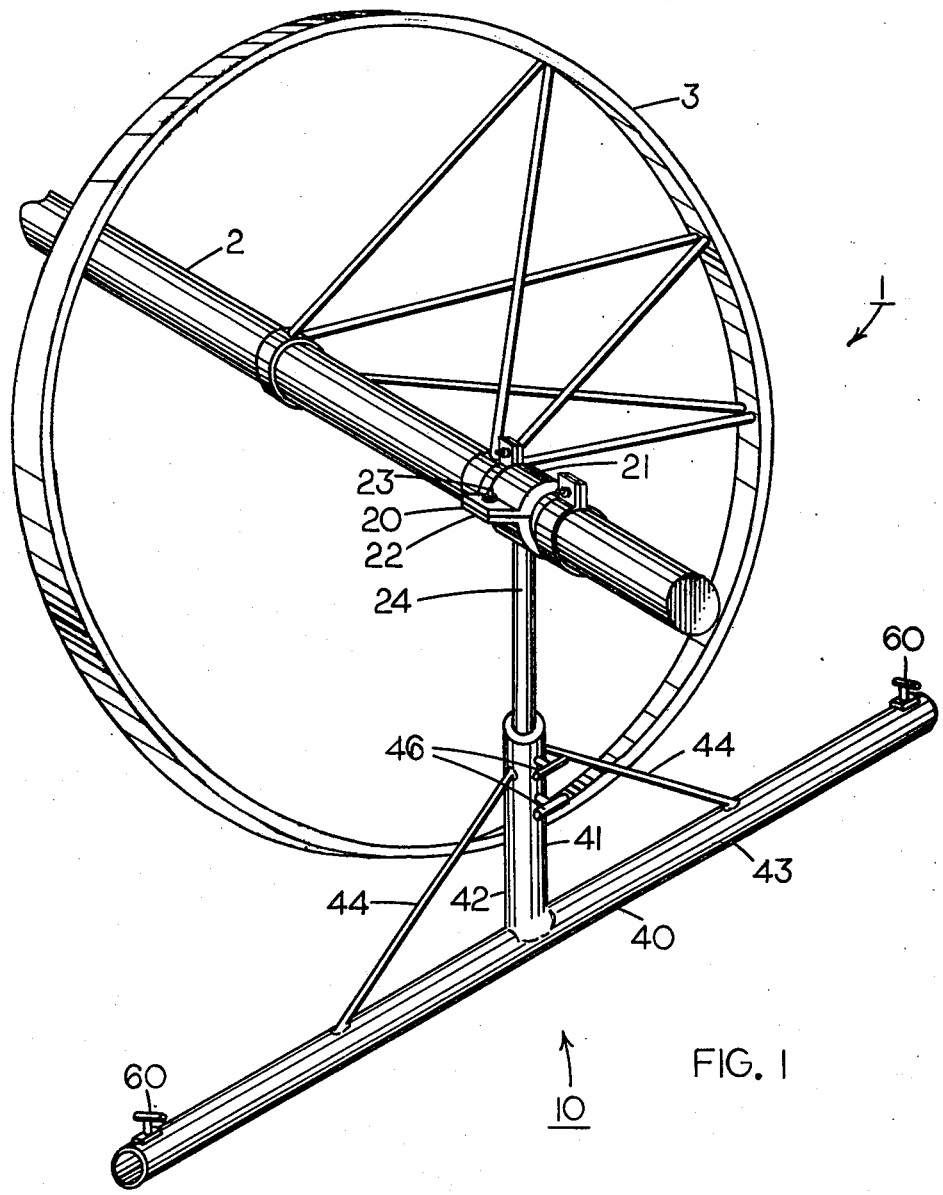
FIG. 1 is a perspective view of the brake mechanism that forms the present invention mounted on the outboard end of a mobile irrigation system.

As can be seen by reference to FIG. 1, the braking mechanism is designated generally as 10, and is designed for use on an irrigation device 1, whose main components comprise; an elongated irrigation pipe 2, which extends through, and is supported by, a plurality of wheel members 3, in a well recognized manner.

The breaking mechanism 10, comprises four main components, the first of which is a collar assembly 20, which is dimensioned to be secured around the outboard end of the irrigation pipe 2. The collar assembly comprises a pair of arcuate clamp members 21, 21' having apertured flanges 22, extending outwardly from their sides. Securing means 23, are provided to attach the collar assembly to the irrigation pipe by any one of a number of accepted methods. The lower clamp member 21', is further provided with an elongated rod member 24, which is permanently secured thereto, and depends downwardly therefrom.

The second main component of the brake mechanisms 10, is the brake member 40, which comprises a generally inverted T-shaped brake element 41. The brake element 41, further comprises an elongated hollow vertical tubular member 42, which is connected to an elongated hollow horizontal tubular member 43. To give further rigidity and structural support to the brake element 41, a pair of brace members 44, are connected between the vertical tubular member 42, and the horizontal tubular member 43.

In addition, the brake element 41, is provided with a plurality of ground penetrating spikes 45, which project downwardly from the horizontal tubular member 43, and are diposed on either side of the juncture of the vertical and horizontal tubular members. As shown in the drawings, the spike members 45, are spaced from each other, and from the ends of the horizontal tubular member 42, for reasons that will be explained in greater detail, further on in the specification.

Returning now to the cooperation of the two main components 20 and 40, heretofore described, it can be seen in FIG. 1, that the elongated hollow vertical tubular member 42, is dimensioned to slidingly receive the depending elongated rod member 24; and these components are vertically reciprocable relative to one another, to vary the height of the brake element 41, with respect to the ground.

In order to lock the two components together at any given position, the hollow vertical tubular member 42, is provided with suitably dimensioned aperture to receive a locking nut or set screw 46, which will frictionally engage and immobilize the elongated rod member 24, within the vertical tubular member 42, at any desired position.

The third component that comprises the breaking mechansim is a wheeled member 50, that is adapted to be connected to either end of the hollow horizontal tubular member 43. The wheeled member 50, comprises a wheel 51, and an axle 52. The free end of axle 52, is further dimensioned to be received within, either end of the horizontal tubular member 43.

In order that the wheeled memer 50, may be locked into a desired position on either end of the horizontal tubular member 43; the member 43 is provided with suitably dimensioned apertures proximate its ends, which receive locking nuts or set screws 60, to frictionally engage the axle 52, within the brake element 41.

Figure 2:
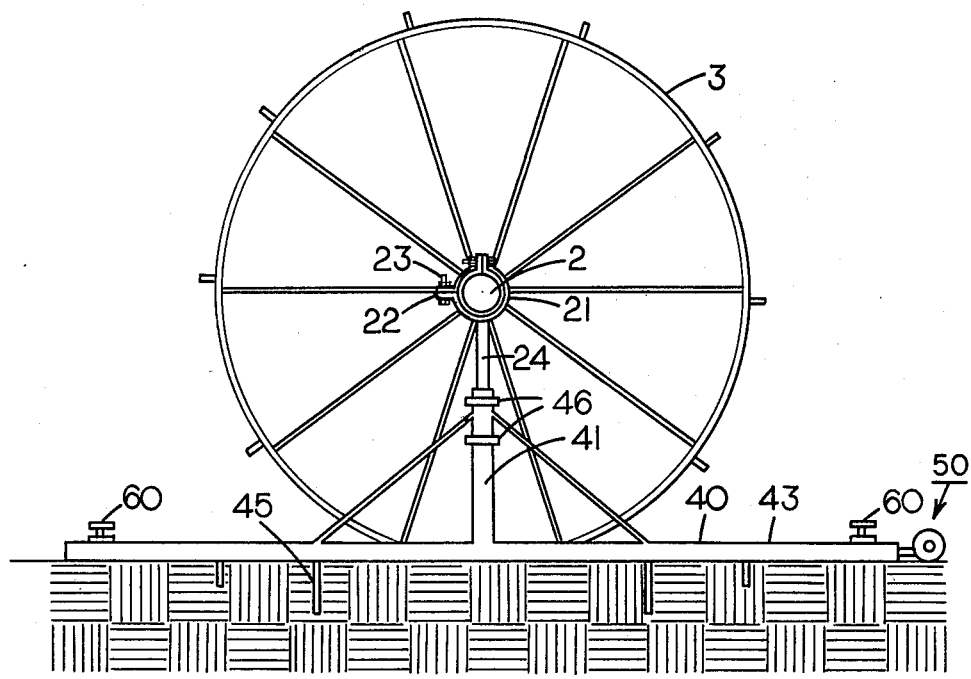
FIG. 2 is a side view of the brake mechanism with the brake engaged.

As can be seen by reference to FIG. 2, when it is desired to engage the brake mechanisms, set screw 46, is loosened so that the brake element 41, can be lowered. Once the brake element has been lowered, the weight of a person standing on top of the horizontal tubular member 43, will cause the spikes 45, to penetrate the ground, thereby anchoring the mechanism. It should also be noted that the contoured axle 52, disposes the bottom of the wheel 51, on the same plane as the bottom of the horizontal member 43, so that the wheel will not interfere with the penetration of the spikes 45.

Figure 3:
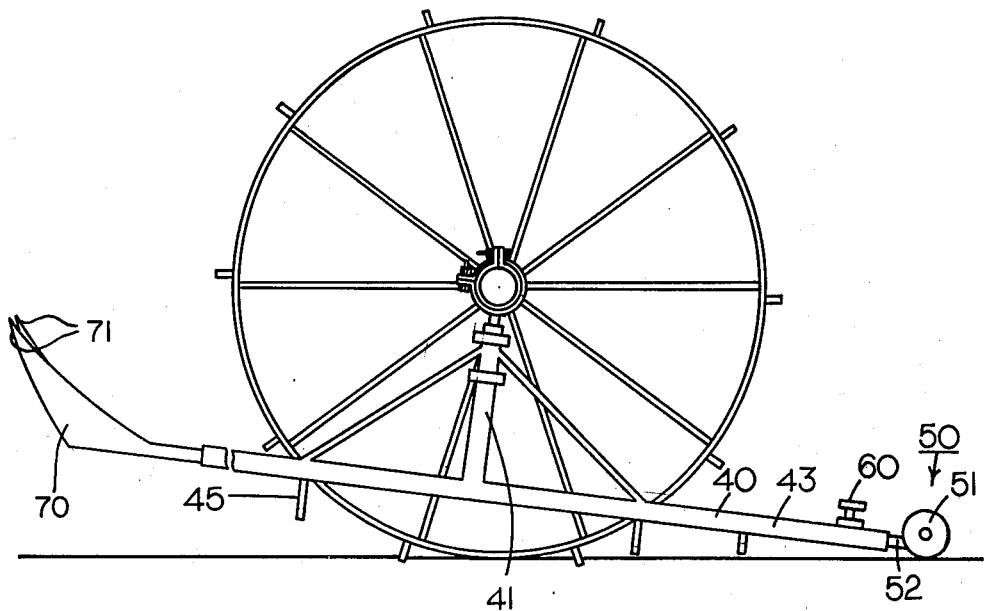
FIG. 3 is a side view of the brake mechanisms with the brake retrated into the transport mode.

Referring now to FIG. 3, it can be seen that in the transport mode the brake element 41, has been elevated with respect to the ground, and the wheel 51, will maintain a rolling contact with the ground over which the irrigation device travels. In this position, the wheeled member 50, acts as a counterbalanced weight, which will cause the brake mechanism to assume the position illustrated in FIG. 3.

The wheeled member 50, therefore serves the dual purpose of facilitation the transport of the brake mechanism on the mobile irrigation system, and further acts as a counterbalance weight, which causes the end of the brake member that does not carry the wheel, to be elevated. This elevation or angling of the brake member 40, raises the ground engaging spikes 45, above the level of most of the vegetation traversed by the irrigation system and substantially reduces the likehood that the brake member 40, will become entangled in the vegetation during the transport mode. Obviously the wheeled member 50, can be attached to either end of the brake member 40, depending on the desired direction of travel.

The fourth component that comprises the braking mechanism 10, is a flair element 70, for deflecting vegetation away from the brake element 41, as it is transported on the irrigation system. This flair element 70, comprises a generally triangular member having its two free ends 71, turned upwardly, so that the free ends will deflect vegetation to either side of the flair element, in a well recognized manner. The captive end of the triangular member is dimensioned to be slidingly received within either end of the horizontal member 43, and is intended to be disposed on the leading edge of the brake element 41, as it travels through the fields.

It should be readily apparent from the foregoing that a brake member, built in accordance the principals herein disclosed, wll produce a simple, efficient , and reliable braking mechanism for mobile irrigation systems, that is easy to install and use.

Having thereby described that subject matter of this invention it should be obvious that may substitutions, modifications, and variations of the invention are possible in light of the above teachings. It is therefore to be understood that the invention as taught and described is only to be limited to the extent of the breadth and scope of the appended claims.

What we claim is:

1. A brake mechanism for use on a mobile irrigation system comprising an elongated irrigation pipe supported by a plurality of wheel elements, wherein the brake mechanism comprises:
   a first component rotatably secured to the irrigation pipe and having a depending portion projecting therefrom, and
   a second elongated generally horizontal component mounted for reciprocal movement with respect to said first component, and having an elongated horizontal member provided with a plurality of ground penetrating means spaced from one another, and from the ends of the horizontal member, and disposed on (its) the lower surface of said horizontal member; wherein the spacing of the ground penetrating means on the horizontal member is such that in at least one position the ground penetrating means will be raised out of contact with the ground during the transportation mode of the mobile irrigation system.

2. A brake mechanism as in claim 1; further comprising,
   a third component comprising a wheel and axle adapted to be releasably secured to said second component.

3. A brake mechanism as in claim 1; wherein
said first component comprises a pair of clamp members dimensioned to surround said irrigation pipe, wherein one of said clamp members is provided with a downwardly depending elongated rod member.

4. A brake mechanism as in claim 3; wherein,
said second component comprises an inverted tubular member dimensioned to slidingly receive the elongated rod member of the first component, and an elongated hollow horizontal member having a plurality of downwardly depending spikes, spaced from one another and the ends of the horizontal member.

5. A brake mechanism as in claim 4; wherein,
securing means are provided to releasably secure the second component to the first component.

6. A brake element is in claim 4; further comprising,
a third component comprising a wheel and axle, wherein the axle is dimensioned to be slidingly received in the ends (with either) of the elongated horizontal member.

7. A brake element as in claim 6; wherein,
additional securing means are provided to releasably secure the axle within one of the ends of the horizontal member.

8. A brake element as in claim 7; wherein,
the wheel and axle act as a counterweight on one end of the horizontal member, to elevate the other end of the horizontal member, and facilitate the transport of the brake mechanism on the mobile irrigation system.

9. A brake element as in claim 5; further comprising,
a fourth component comprising a flair element that is dimensioned to be received in the ends (with either) of the elongated horizontal member.

10. A brake element as in claim 9; wherein the flair element comprises,
a generally triangular member having is free ends turned upwardly so that it will deflect vegetation away from the brake element as the brake element is transported on the mobile irrigation system.

* * * * *